(12) United States Patent
Murayama

(10) Patent No.: US 9,327,696 B2
(45) Date of Patent: May 3, 2016

(54) HYDRAULIC BRAKING SYSTEM

(71) Applicants: DENSO CORPORATION, Kariya, Aichi-pref (JP); Advics Co., Ltd., Kariya, Aichi-pref (JP)

(72) Inventor: Takashi Murayama, Kariya (JP)

(73) Assignees: DENSO CORPORATION, Kariya, Aichi-pref. (JP); ADVICS CO., LTD., Kariya (JP)

( * ) Notice: Subject to any disclaimer, the term of this patent is extended or adjusted under 35 U.S.C. 154(b) by 74 days.

(21) Appl. No.: 14/100,329

(22) Filed: Dec. 9, 2013

(65) Prior Publication Data

US 2014/0167495 A1 Jun. 19, 2014

(30) Foreign Application Priority Data

Dec. 14, 2012 (JP) ................... 2012-273504

(51) Int. Cl.
*B60T 8/40* (2006.01)
*B60T 8/32* (2006.01)
*B60T 8/34* (2006.01)

(52) U.S. Cl.
CPC ............ *B60T 8/4081* (2013.01); *B60T 8/3275* (2013.01); *B60T 8/348* (2013.01)

(58) Field of Classification Search
CPC ..... B60T 8/4872; B60T 8/4013; B60T 8/341; B60T 8/4081; B60T 8/3275; B60T 8/348
USPC ............ 303/113.2, 116.1, 10, 119.1, 152, 11
See application file for complete search history.

(56) References Cited

U.S. PATENT DOCUMENTS

| 4,900,102 | A | * | 2/1990 | Jonner et al. | ............... 303/116.2 |
| 5,156,447 | A | * | 10/1992 | Hummel et al. | ........... 303/113.2 |
| 5,156,448 | A | * | 10/1992 | Kirstein | .................... 303/113.2 |
| 5,205,623 | A | * | 4/1993 | Holzmann et al. | ......... 303/113.2 |
| 5,342,120 | A | * | 8/1994 | Zimmer et al. | ............ 303/113.2 |
| 5,924,775 | A | * | 7/1999 | Steffes | ....................... 303/116.2 |
| 6,007,165 | A | * | 12/1999 | Sato et al. | ..................... 303/191 |
| 6,238,019 | B1 | * | 5/2001 | Okazaki et al. | ............... 303/146 |

(Continued)

FOREIGN PATENT DOCUMENTS

| JP | 10-244923 | 9/1998 |
| JP | 2002-098101 | 4/2002 |

(Continued)

OTHER PUBLICATIONS

Office Action dated Feb. 3, 2015 in corresponding Japanese Application No. 2012-273504.

*Primary Examiner* — Xuan Lan Nguyen
(74) *Attorney, Agent, or Firm* — Harness, Dickey & Pierce, P.L.C.

(57) ABSTRACT

A hydraulic braking system has a brake actuator including hydraulic pumps that generate a W/C pressure by sucking and discharging a brake fluid from a master reservoir, and suck the brake fluid discharged from the W/C side for decompressing a W/C pressure during anti-lock braking. Further, open-when-self-priming valves that suck the brake fluid by themselves from the master reservoir in the hydraulic pumps are provided. Further, an accumulator is provided in a pipe connecting the hydraulic pumps and the W/C, and an accumulation to the accumulator is performed by the hydraulic pumps. Then, communication and cut-off of a pipe connected to the accumulator are controlled by lower limit indicating valves.

10 Claims, 4 Drawing Sheets

(56) References Cited

U.S. PATENT DOCUMENTS

| | | | |
|---|---|---|---|
| 6,464,307 B1 * | 10/2002 | Yoshino | 303/11 |
| 6,494,545 B2 | 12/2002 | Nakamura et al. | |
| 2002/0035832 A1 | 3/2002 | Nakamura et al. | |
| 2011/0077831 A1 | 3/2011 | Nishino et al. | |
| 2011/0272228 A1 | 11/2011 | Kunz et al. | |
| 2012/0144822 A1 | 6/2012 | Isono et al. | |

FOREIGN PATENT DOCUMENTS

| | | |
|---|---|---|
| JP | 2011-051400 | 3/2011 |
| JP | 2011-073535 | 4/2011 |
| JP | 2012-509801 | 4/2012 |

* cited by examiner

HYDRAULIC BRAKING SYSTEM

CROSS-REFERENCE TO RELATED APPLICATION

This application is based on and claims the benefit of priority from earlier Japanese Patent Application No. 2012-273504 filed Dec. 14, 2012, the description of which is incorporated herein by reference.

TECHNICAL FIELD

The present disclosure relates to a hydraulic braking system capable of performing cooperative control of a regenerative braking system.

BACKGROUND

Conventionally, a braking system that stores hydraulic pressure in an accumulator using a brake fluid supplied from a hydraulic pump, and generates a high wheel cylinder pressure by pushing a master piston by using the hydraulic pressure stored in the accumulator when braking has been proposed in Japanese Patent Application Laid-Open Publication No. 2011-51400, for example.

In the braking system, an anti-lock system disposed between a master cylinder (hereinafter referred to as M/C) and a wheel cylinder (hereinafter referred to as W/C) is provided.

By boosting/decompressing a wheel cylinder pressure using a hydraulic pump provided in the anti-lock system, wheels are prevented from locking.

However, when pushing the master piston using the brake fluid pressure (hydraulic pressure) that is accumulated in the accumulator as in the Publication '400, it is necessary to push the master piston to produce the hydraulic pressure corresponding to an amount of braking operation when braking.

Therefore, it is necessary to decompress the high brake fluid pressure to a desired pressure.

As a result, a large energy loss takes place when decompressing the high pressure.

Further, since the hydraulic pump for storing brake fluid pressure in the accumulator and the other hydraulic pump that is provided in the anti-lock system must be provided separately, the number of parts increases.

SUMMARY

An embodiment provides a hydraulic braking system that can share a hydraulic pump and can reduce energy loss.

In a hydraulic braking system according to a first aspect, the hydraulic braking system includes a master cylinder that operates based on an operation of a brake operating member, a reaction force generating section connected to the master cylinder that provides a reaction force to the brake operating member in accordance with an operated amount thereof by generating a reaction force hydraulic pressure in the master cylinder in response to the operated amount of the brake operating member, a reservoir that stores a brake fluid therein, and a wheel cylinder that generates a braking force based on a brake fluid pressure.

The hydraulic braking system further includes a brake actuator that has a hydraulic pump which generates the brake fluid pressure to the wheel cylinder by sucking the brake fluid from the reservoir and supplying the brake fluid to the wheel cylinder, and sucks the brake fluid discharged from the wheel cylinder side for decompressing the brake fluid pressure from the wheel cylinder during anti-lock braking, The hydraulic braking system further includes a self-priming control section having an open-when-self-priming valve for controlling communication and cut-off of a first piping that self-sucks the brake fluid from reservoir in the hydraulic pump, an accumulator for storing the brake fluid pressure in a predetermined pressure range, to which the brake fluid is supplied from the reservoir by the hydraulic pump, connected to a second piping that connects between the hydraulic pump and the wheel cylinder, and a high-pressure generating section having a lower limit indicating valve for controlling communication and cutoff between the second piping and the accumulator.

According to the hydraulic braking system configured above, the hydraulic pump provided to the brake actuator can be shared for adjusting the W/C pressure during the ABS control or the like, and for forming the high-pressured accumulator pressure.

Furthermore, although the high-pressured accumulator pressure is formed, the accumulator pressure is not always used during normal operation when generating the braking force by the hydraulic braking system, the pressurization of the W/C pressure by the hydraulic pumps can be performed.

Then, the accumulator pressure may be used when the pressure of the W/C pressure generated by the hydraulic pumps is delayed with respect to the target W/C pressure.

Therefore, it is possible to reduce the energy loss as compared with a case of using the high-pressured accumulator pressure that is always being pressure-reduced.

As a result, it is possible to constitute the hydraulic braking system that can share the hydraulic pumps and reduce the energy loss.

Moreover, since the hydraulic pumps can be shared, it is possible to reduce the number of parts as well as downsizing the system as compared with a case where an extra hydraulic pump is provided for forming the accumulator pressure.

In the hydraulic braking system according to a second aspect, the master cylinder and the wheel cylinder are connected via a third piping, the brake actuator is provided with a differential pressure control valve, which is disposed in the third pipe, for controlling a differential pressure between a master cylinder side and a wheel cylinder side, and a suction side of the hydraulic pump is connected to the third piping between the master cylinder and the differential pressure control valve and a discharge side of the hydraulic pump is connected to the third piping between the wheel cylinder and the differential pressure control valve.

In the hydraulic braking system according to a third aspect, the reaction force generating section includes a cutoff valve provided in the third piping between the master cylinder and the differential pressure control valve, a stroke simulator connected to the master cylinder, and a simulator cutoff valve that controls a communication and cutoff between the stroke simulator and the master cylinder.

In the hydraulic braking system according to a fourth aspect, wherein, when generating the brake fluid pressure to the wheel cylinder, the brake fluid is supplied to the wheel cylinder by actuating the hydraulic pump under a condition where the third piping is closed by the cutoff valve, the first piping is opened by the open-when-self-priming valve, and the differential pressure control valve is set to a differential pressure condition.

In the hydraulic braking system according to a fifth aspect, wherein, when the brake fluid pressure stored in the accumulator is lower than the predetermined range, the brake fluid is supplied to the accumulator by actuating the hydraulic pump under a condition where the first piping is opened by the open-when-self-priming valve, between the accumulator and the second piping is opened by the lower limit indicating valve, and the differential pressure control valve is set to a differential pressure condition.

In the hydraulic braking system according to a sixth aspect, wherein, when generating the brake fluid pressure to the wheel cylinder, the brake fluid is supplied to the wheel cylinder by actuating the hydraulic pump under a condition where the third piping is closed by the cutoff valve, the first piping is opened by the open-when-self-priming valve, and the differential pressure control valve is set to a differential pressure condition, and the brake fluid is supplied also from the accumulator to the wheel cylinder under a condition where between the accumulator and the second piping is opened by the lower limit indicating valve.

In the hydraulic braking system according to a seventh aspect, the lower limit indicating valve is a differential pressure control valve for generating the differential pressure in the brake fluid pressure of the accumulator and the brake fluid pressure of the wheel cylinder according to an amount of current supplied to a solenoid, and when supplying the brake fluid to the wheel cylinder from the accumulator, the differential pressure is increased gradually by increasing the amount of current supplied to the solenoid of the lower limit indicating valve gradually.

DETAILED DESCRIPTION OF THE PREFERRED EMBODIMENTS

With reference to the drawings, hereinafter will be described embodiments of the present disclosure.

First Embodiment

Figure 1:
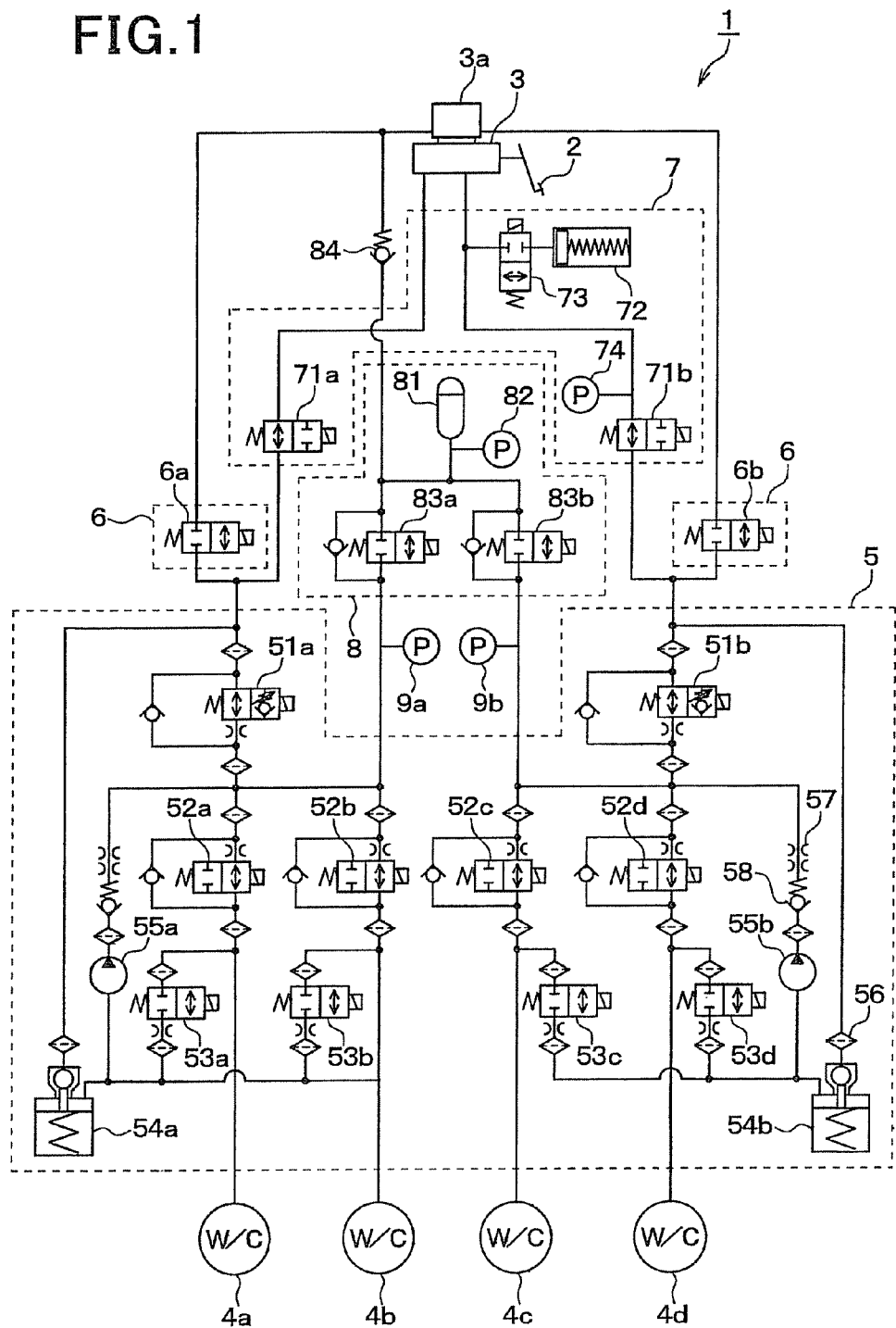
FIG. 1 shows a hydraulic circuit structure of a hydraulic braking system according to a first embodiment of the present disclosure.

A hydraulic braking system 1 according to a first embodiment of the present disclosure is described by using FIG. 1.

As shown in FIG. 1, the hydraulic braking system 1 is provided with a brake pedal 2, a master cylinder 3 (hereinafter referred to as M/C), wheel cylinders 4a-4d (hereinafter referred to as W/C), a brake actuator 5, a self-priming control section 6, a reaction force generating section 7, a high-pressure generating section 8, and W/C pressure sensors 9a, 9b.

The brake pedal 2 pushes a master piston provided inside the M/C 3 by being stepped by a driver.

An operated amount of the brake pedal 2 is detected by an operation amount sensor such as a stroke sensor or a stepping force sensor.

The operated amount of the brake pedal 2 is acquired by a brake ECU (electronic control section, not shown) by transmitting a signal from the operation amount sensor to the brake ECU.

Note that although the brake pedal 2 is used as an example for a brake operating member here, a brake lever or the like may be applied.

A master reservoir 3a is provided with the M/C 3.

The master reservoir 3a supplies a brake fluid to the M/C 3 and stores the brake fluid excess from the M/C 3. The master reservoir 3a also supplies the brake fluid that generates a braking force in a region where a regenerative braking system (not shown) cannot generate.

The W/C 4a-4d are provided with corresponding to each wheel, and are connected to each chamber (not shown) in the M/C 3 through pipes provided in every two piping systems.

Each piping system is connected to each W/C 4a-4d via the brake actuator 5.

Hereinafter, a system to which the W/C 4a, 4b are connected is referred to as a first piping system, and a system to which the W/C 4c, 4d are connected is referred to as a second piping system.

The brake actuator 5 is intended to perform brake fluid pressure control. The brake actuator 5 is provided with a plurality of pipes in a metal housing for controlling the brake fluid pressure, and constitutes a brake fluid circuit for adjusting W/C pressure by providing various solenoid valves or the like.

More specifically, the brake actuator 5 is provided with differential pressure control valves 51a, 51b, boosting control valves 52a-52d, decompressing control valves 53a-53d, pressure regulating reservoirs 54a, 54b, and hydraulic pumps 55a, 55b.

The differential pressure control valve 51a, 51b is an electromagnetic valve constituted by a normally open valve that can adjust the differential pressure linearly according to an amount of current supplied to a solenoid, and is provided in the pipes of each piping system.

The pipes of each piping system are branched into two in the downstream of the differential pressure control valves 51a, 51b, i.e., in an opposite side to the M/C 3, and the boosting control valves 52a-52d are provided with each branched pipe. Each pipe is connected to the W/C 4a-4d, respectively.

Then, between the W/C 4a-4d and the boosting control valves 52a-52d in each pipe are connected to the pressure regulating reservoirs 54a, 54b via the decompressing control valves 53a-53d.

The boosting control valve 52a-52d is an electromagnetic valve constituted by normally open valve that open when not energized, and is closed when energized. The boosting control valves 52a-52d are used for controlling a pressure increase of the W/C pressure during an ABS (anti-lock braking system) control.

The decompressing control valve 53a-53d is an electromagnetic valve constituted by a normally closed valve that is closed when not energized, and open when energized. The decompressing control valves 53a-53d are used for controlling a pressure decrease of the W/C pressure during the ABS control.

The pressure regulating reservoir 54a, 54b is provided in each piping system, and is used for storing the brake fluid from the W/C 4a-4d side when decompressing the W/C pressure during the ABS control.

Moreover, the pressure regulating reservoirs 54a, 54b are also connected to the upstream side of the differential pressure control valves 51a, 51b, in particular, connected to the master reservoir 3a side, and are also used when generating the W/C pressure by sucking the brake fluid from the master reservoir 3a using the hydraulic pumps 55a, 55b.

In this case, by adjusting a flow rate of the brake fluid flowing into the pressure regulating reservoir 54a, 54b using a pressure regulating valve therein, the differential pressure between the upstream side and the downstream side of the pressure regulating valve is adjusted so as to balance in a desired relationship.

The hydraulic pumps 55a, 55b, are driven by a single motor (not shown). The hydraulic pumps 55a, 55b pressurize the W/C pressure by sucking the brake fluid stored in the pressure regulating reservoirs 54a, 54b and discharging the brake fluid into the W/C 4a-4d side.

In addition to the ABS control, etc., the hydraulic pumps 55a, 55b are also used when generating the W/C pressure by sucking the brake fluid from the master reservoir 3a.

Further, the hydraulic pumps 55a, 55b are also used for storing a high-pressured brake fluid in the high-pressure generating section 8 by sucking the brake fluid from the master reservoir 3a.

In this way, the hydraulic pumps 55a, 55b are shared in adjusting the W/C pressure, such as in the ABS control, and forming the high-pressured brake fluid stored in the high-pressure generating section 8.

Further, the brake actuator 5 is provided with filters 56 that prevent foreign matter from entering into each component, orifices 57 for preventing pulsation, and check valves 58 that prevent high pressure from being applied to discharge port sides of the hydraulic pumps 55a, 55b.

With such a configuration, the brake actuator 5 is composed.

The self-priming control section 6 is composed of open-when-self-priming valves 6a, 6b provided in pipes connecting the M/C 3 side of the differential pressure control valves 51a, 51b and the master reservoir 3a among the pipes provided in each piping system.

The open-when-self-priming valve 6a, 6b is an electromagnetic valve constituted by normally close valve that is closed when not energized, and open when energized.

The open-when-self-priming valves 6a, 6b are energized to be in the communicated condition when generating the W/C pressure in the hydraulic pumps 55a, 55b by sucking the brake fluid from the master reservoir 3a, or when storing the high-pressured brake fluid in the high-pressure generating section 8.

The reaction force generating section 7 is connected to the M/C 3. The reaction force generating section 7 generates a reaction force hydraulic pressure in response to a stepping force of the brake pedal 2 by the driver in the M/C 3, and supplies the reaction force hydraulic pressure to the brake pedal 2.

Specifically, the reaction force generating section 7 is composed of cutoff valves 71a, 71b, a stroke simulator 72, and a simulator cutoff valve 73.

The cutoff valves 71a, 71b are disposed in each piping system that connects between the M/C 3 and the respective W/C 4a-4d, and are disposed in the upstream side of each differential pressure control valve 51a, 51b, that is in the M/C 3 side.

The cutoff valve 71a, 71b is an electromagnetic valve constituted by a normally open valve that open when not energized, and is closed when energized.

The cutoff valves 71a, 71b are in the cutoff condition by being energized when cutting off the brake fluid in the M/C 3 supplied to the W/C 4a-4d side in accordance with the operation of the brake pedal 2.

The stroke simulator 72 is connected to a pipe of one of the first and second piping systems in the M/C 3 side of the shutoff valve 71a, 71b, and generates the brake fluid pressure in order to form a reaction force characteristic in accordance with the operated amount of the brake pedal 2.

The simulator cutoff valve 73 is disposed in a pipe connecting the stroke simulator 72 and the M/C 3, and is an electromagnetic valve constituted by normally close valve that is closed when not energized, and open when energized.

The simulator cutoff valve 73 is energized when the cutoff valves 71a, 71b become in the cutoff condition.

Although the flow of the brake fluid from the M/C 3 to the W/C 4a-4d side is cutoff at this time, the flow of the brake fluid is allowed to the stroke simulator 72 side by energizing the simulator cutoff valve 73 to set it in the communicated condition, thereby the desired reaction force is applied to the brake pedal 2.

Note that an M/C pressure sensor 74 for detecting the M/C pressure is also provided in the reaction force generating section 7.

The M/C pressure is monitored by a detected signal from the M/C pressure sensor 74 being transmitted to the brake ECU so that whether the reaction force characteristic corresponding to the operated amount of the brake pedal 2 is realized becomes verifiable.

The high-pressure generating section 8 is intended to store a pressure in a predetermined pressure range, such as the high pressured brake fluid higher than the W/C pressure generated in the W/C 4a-4d during braking, for example.

In the present embodiment, the high-pressure generating unit 8 is composed of an accumulator 81, an accumulator pressure sensor 82, and lower limit indicating valves 83a, 83b.

The accumulator 81 is disposed in a pipe leading to both piping systems, and stores the high-pressure brake fluid therein by the brake fluid being supplied from the master reservoir 3a using the hydraulic pumps 55a, 55b.

The accumulator pressure sensor 82 detects an accumulator pressure that is the brake fluid pressure accumulated in the accumulator 81, and a detected signal is transmitted to the brake ECU.

The brake ECU controls the lower limit indicating valve 83a, 83b, the hydraulic pumps 55a, 55b, and the like based on the detected signal of the accumulator pressure sensor 82 so that the accumulator pressure to be in a predetermined pressure range.

The lower limit indicating valve 83a, 83b is an electromagnetic valve constituted by normally close valve that is closed when not energized, and open when energized.

The lower limit indicating valves 83a, 83b also function as differential pressure control valves for controlling the differential pressure between the accumulator pressure and the W/C pressure by adjusting valve positions according to an amount of current supplied to solenoids.

The lower limit indicating valves 83a, 83b are configured to be in the communicated condition by the brake ECU when the accumulator pressure reaches a lower limit of a predetermined pressure range, and boost the accumulator pressure by allowing the brake fluid flow into the accumulator 81.

In order to prevent the accumulator pressure from being too high, between the both lower limit indicating valves 83a, 83b and the master reservoir 3a are connected by a pipe, and a relief valve 84 is disposed in the pipe.

Therefore, when the accumulator pressure reaches the relief pressure of the relief valve 84, the brake fluid is released to the master reservoir 3a, and the accumulator pressure is not allowed to increase further.

The W/C pressure sensors 9a, 9b detect the W/C pressure generated in the W/C 4a-4d in each piping system, and transmit detected signals to the brake ECU.

When pressurizing the W/C 4a-4d using accumulator pressure, for example, the brake ECU adjust the current indicating value to the lower limit indicating valves 83a, 83b based on the detected signals of the accumulator pressure sensor 82 and the detected signals of the W/C pressure sensors 9a, 9b.

Thereby, between the W/C pressure and the accumulator pressure is adjusted to a desired differential pressure, and the W/C pressure is adjusted to a target pressure.

In the manner described above, the hydraulic braking system according to the present embodiment is configured.

Subsequently, an operation of the hydraulic braking system that is configured in this manner is explained.

First, when the vehicle is started operating by turning on a starter switch, for example, and if the high pressure is not accumulated in the accumulator 81, the brake ECU controls the accumulator pressure to be in a desired range based on the detection signals of the accumulator pressure sensor 82.

As a result, the open-when-self-priming valves 6a, 6b become in the communicated condition, the differential pressure control valves 51a, 51b become in the differential pressure condition, the boosting control valves 52a-52d become in the cutoff condition, the lower limit indicating valves 83a, 83b become in the communicated condition, and the hydraulic pumps 55a, 55b are turned on.

Therefore, the brake fluid is supplied to the accumulator 81 side from the master reservoir 3a by the hydraulic fluid pressure pumps 55a, 55b, and the accumulator pressure is boosted.

Then, when the accumulator pressure is boosted to the desired range, the brake ECU stops the above operation.

Then, during the normal braking, the hydraulic braking system is actuated based on the cooperative control of the hydraulic braking system and the regenerative braking system.

First, when a braking force corresponding to the operation of the brake pedal 2 can be generated only by a regenerative brake of the regenerative braking system during the normal braking, the cutoff valves 71a, 71b become in the cutoff condition, and the simulator cutoff valve 73 becomes in the communicated condition by the brake ECU.

Thereby, the brake fluid in the M/C 3 flows to the stroke simulator 72 side in accordance with the driver stepping on the brake pedal 2, and the reaction force with a desired reaction force characteristic is applied to the brake pedal 2 by the stroke simulator 72.

Therefore, it is possible to generate the braking force according to the operated amount of the brake pedal 2 only by regenerative braking, and generate the reaction force according to the operation amount with respect to the brake pedal 2 at the same time.

Incidentally, the open-when-self-priming valves 6a, 6b and the hydraulic pumps 55a, 55b may or may not be operated at this time, and whether they are to be operated is configured in accordance with required specifications.

For example, when it takes time to generate the braking force according to the operation of the brake pedal 2 only by the regenerative braking in the case where the vehicle speed is relatively high, for example, a shortage of the braking force needs to be compensated by the hydraulic braking system at the beginning of the braking.

Further, it may be necessary to generate the braking force not by the regenerative braking system, but by the hydraulic brake by the hydraulic braking system immediately before the vehicle is stopped.

In such a case, even though the desired braking force can be generated only by the regenerative braking eventually, the hydraulic brake becomes necessary, and since the hydraulic brake is needed to be generated immediately, a responsiveness of the hydraulic brake is required.

In contrast, even when not generating the hydraulic brake, if the brake fluid is maintained in a circulating condition by setting the open-when-self-priming valves 6a, 6b to the communicated condition and operating the hydraulic pumps 55a, 55b, the responsiveness of the hydraulic brake can be enhanced.

Thus, whether to operate the open-when-self-priming valves 6a, 6b and the hydraulic pumps 55a, 55b may be configured depending on the required responsiveness.

Further, when the braking force corresponding to the operation of the brake pedal 2 cannot be generated only by the regenerative brake of the regenerative braking system during the normal braking, the brake ECU controls pressurizing of the W/C 4a-4d by the hydraulic braking system.

Specifically, the cutoff valves 71a, 71b become in the cutoff condition, the simulator cutoff valve 73 becomes in the communicated condition, the open-when-self-priming valves 6a, 6b become in the communicated condition, the differential pressure control valves 51a, 51b become in the differential pressure condition, and the hydraulic pumps 55a, 55b are turned on.

Regarding the boosting control valves 52a-52d and the decompressing control valves 53a-53d, positions shown in FIG. 1 are maintained.

Thereby, while applying the desired reaction force to the brake pedal 2 by the stroke simulator 72, the brake fluid is supplied to the W/C 4a-4d side from the master reservoir 3a by the hydraulic fluid pressure pumps 55a, 55b.

Consequently, since the differential pressure control valves 51a, 51b are in the differential pressure condition, it is possible to pressurize the W/C 4a-4d.

At this time, an energizing quantity to the differential pressure control valves 51a, 51b is configured so that the differential pressure formed by the differential pressure control valves 51a, 51b becomes the W/C pressure target value corresponding to the operated amount of the brake pedal 2.

Figure 2:
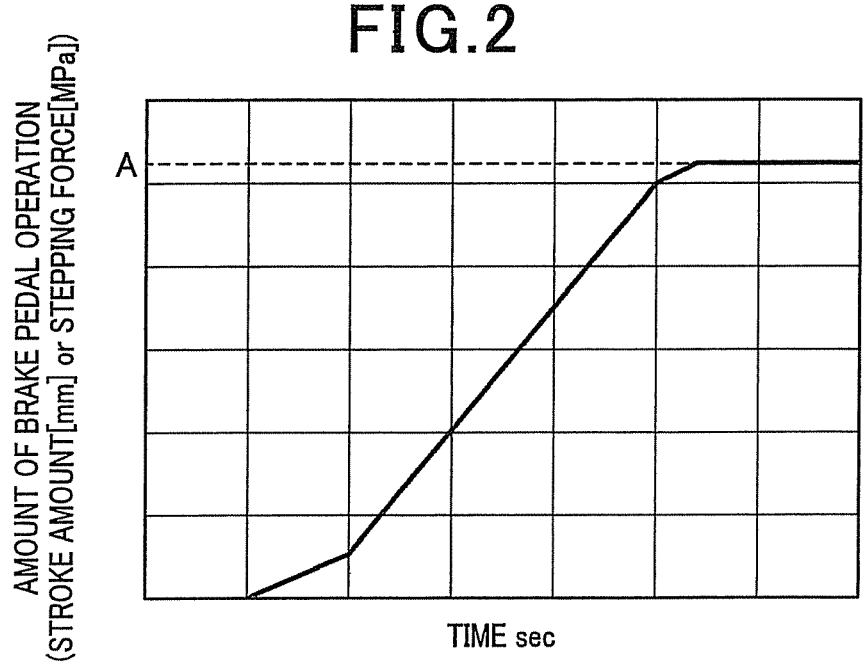
FIG. 2 is a graph showing a relationship between an operation time from a start of operating a brake pedal and an amount of braking operation.
Figure 3:
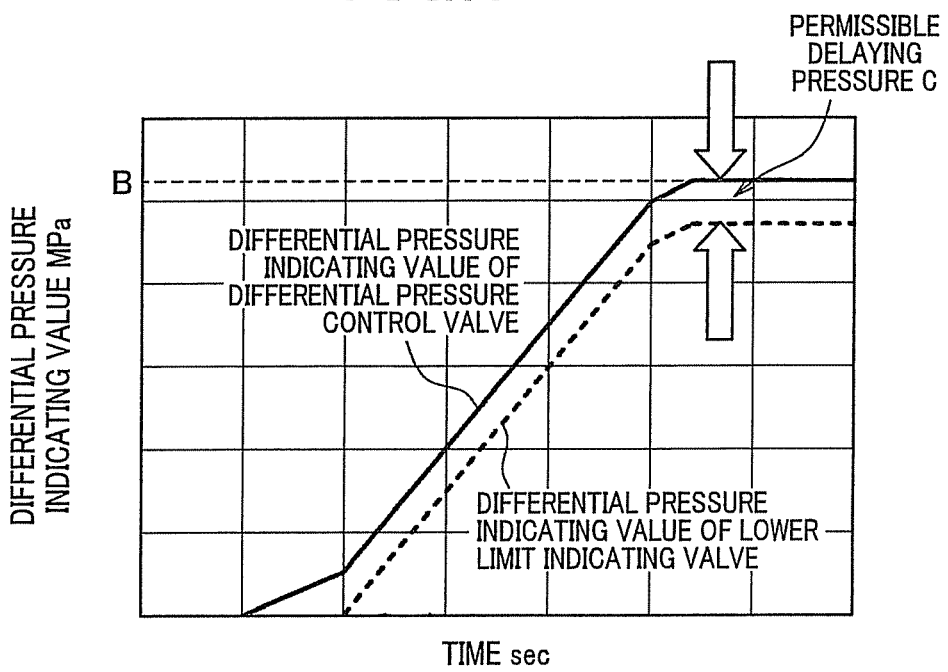
FIG. 3 is a graph showing a relationship between a differential pressure control valve that corresponds to the amount of brake pedal operation and differential pressure indicating values of lower limit indicating valves.

Specifically, when the operated amount is increased in response to an operated time of the brake pedal 2, as shown in FIG. 2, differential pressure indicating values of the differential pressure control valves 51a, 51b are configured in response to changes in the operated amount, as shown in FIG. 3.

For example, in the case where a stroke of the brake pedal 2 is A [mm], the differential pressure indicating value is set to B [MPa].

The differential pressure indicating value at this time is configured to be a hydraulic brake amount generated by the hydraulic braking system by subtracting the regenerative braking amount from the total braking force needed to be generated in accordance with the operated amount of the brake pedal 2.

Thereby, the W/C pressure equivalent to the differential pressure amount generated by the differential pressure control valve 51a, 51b is generated, and the braking force corresponding to the operation of the pedal 2 is generated by the hydraulic brake generated based on the W/C pressure and the regenerative brake generated by the regenerative braking system.

However, a delay in rise of the W/C pressure based on the hydraulic fluid pressure pumps 55a, 55b may occur.

Therefore, a permissible delaying pressure C [MPa] is set, and when a difference between the target W/C pressure and a W/C pressure detected by the W/C pressure sensors 9a, 9b (hereinafter, referred to a measured W/C pressure D) becomes larger than the permissible delaying pressure C [MPa], the delay in rise of the W/C pressure is compensated by using the accumulator pressure.

That is, as shown in FIG. 3, the differential pressure indicating value of the lower limit indicating valves 83a, 83b is configured to a value lower than the differential pressure indicating value of the differential pressure control valves 51a, 51b by the amount of the permissible delaying pressure C [MPa].

Then, when the measured W/C pressure D [MPa] is larger than the target W/C pressure, that is, a difference (B−C) obtained by subtracting the permissible delaying pressure C [MPa] from the differential pressure indicating value B [MPa], the pressurizing using the accumulator pressure is performed in the brake ECU.

In addition, when the measured W/C pressure D [MPa] is less than the difference (B−C), the pressurizing using the accumulator pressure is not performed.

Figure 4:
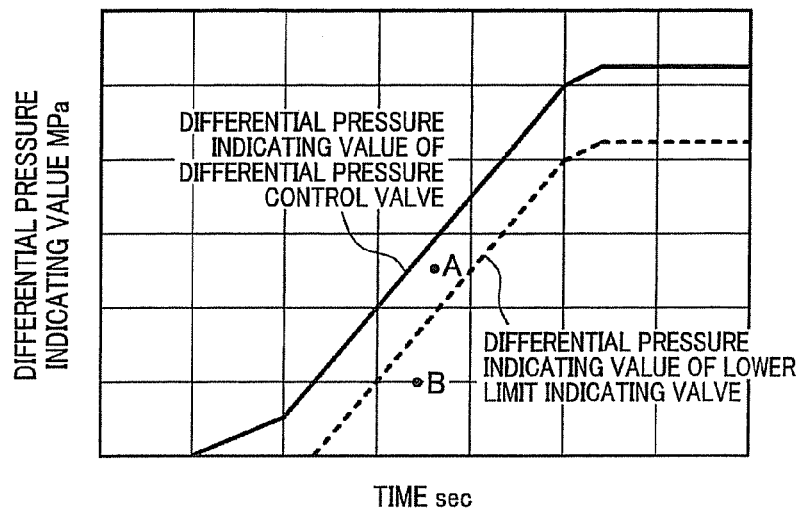
FIG. 4 is a graph showing a relationship between the differential pressure indicating values of the differential pressure control valve and the lower limit indicating valves and a presence of pressurizing using an accumulator pressure to a measured W/C pressure.

For example, as shown in FIG. 4, if the measured W/C pressure D [MPa] is a pressure at a point A, the difference (B−C) is less than the difference permissible delaying pressure C [MPa], thus the pressurizing using the accumulator pressure is not performed.

If the measured W/C pressure D [MPa] is a pressure at a point B, the difference (B−C) is larger than the difference permissible delaying pressure C [MPa], thus the pressurizing using the accumulator pressure is performed.

Specifically, the brake ECU sets the lower limit indicating valves 83a, 83b in the differential pressure condition by configuring the differential pressure indicating value of the lower limit indicating valves 83a, 83b to be a value lower than the differential pressure indicating value of the differential pressure control valves 51a, 51b by the amount of the permissible delaying pressure C [MPa].

Thereby, the measured W/C pressure D [MPa] is prevented from departing from the target W/C pressure not more than the permissible delaying pressure C [MPa].

Figure 5A:
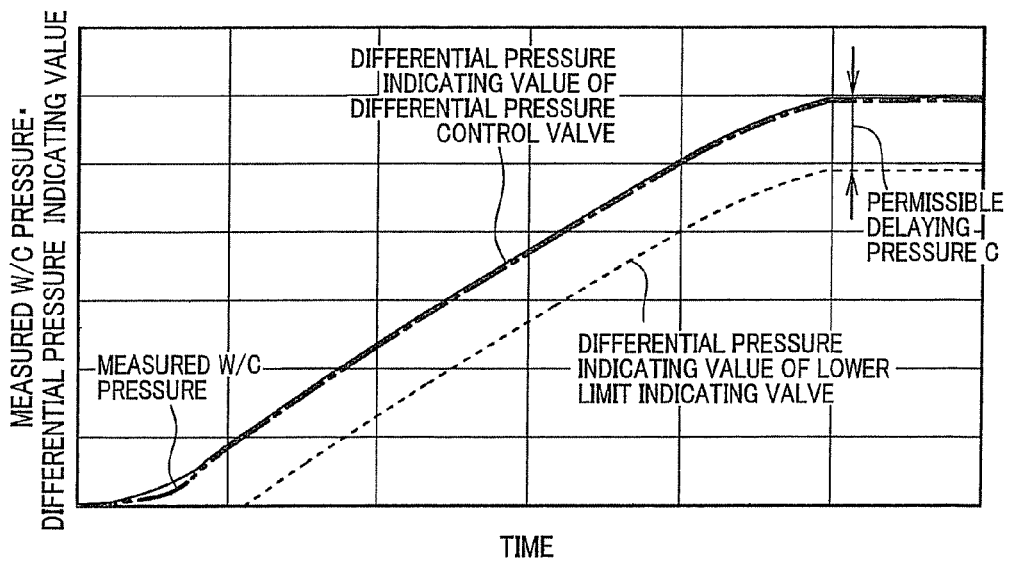
FIG. 5A is a graph showing the differential pressure indicating values of the differential pressure control valve and the lower limit indicating valves when the operation of the brake pedal is performed slowly, and a change in the measured W/C pressure.

For example, as shown in FIG. 5A, when the operation of the brake pedal 2 is performed slowly, a difference between the measured W/C pressure D [MPa] and the differential pressure indicated value of the differential pressure control valves 51a, 51b, which is the target W/C pressure, is small, thus the measured W/C pressure D [MPa] almost follows the target W/C pressure.

Figure 5B:
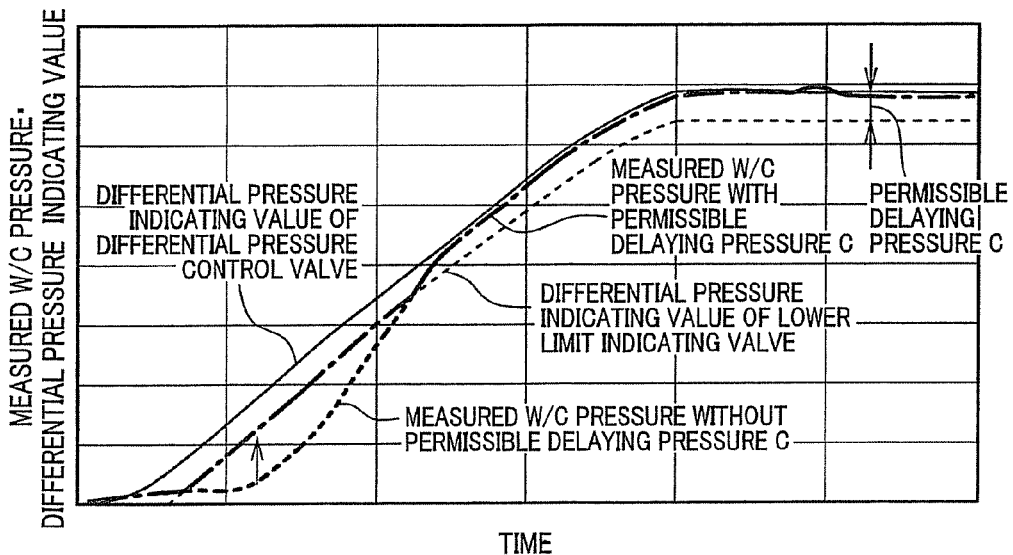
FIG. 5B is a graph showing the differential pressure indicating values of the differential pressure control valve and the lower limit indicating valves when the operation of the brake pedal is performed quickly, and a change in the measured W/C pressure.

In contrast, the measured W/C pressure D [MPa] delays from the target W/C pressure when the brake pedal 2 is operated fast, as shown in FIG. 5B.

At this time, the measured W/C pressure D [MPa] indicated by dashed lines in FIG. 5B falls significantly below the target W/C pressure if the permissible delaying pressure C [MPa] is not set.

However, when the differential pressure indicating value of the lower limit indicating valves 83a, 83b is set by considering the permissible delaying pressure C [MPa], and the difference between the measured W/C pressure D [MPa] and the target W/C pressure reaches the permissible delaying pressure C [MPa], the W/C 4a-4d are configured to be pressurized by using the accumulator pressure.

For this reason, it is possible to configure the difference between the measured W/C pressure D [MPa] and the target W/C pressure to not exceed the permissible delaying pressure C [MPa], thus the measured W/C pressure D [MPa] is made to follow the target W/C pressure.

On the other hand, when the measured W/C pressure D [MPa] has a value larger than that of the target W/C pressure, the differential pressure indicating values of the differential pressure control valves 51a, 51b are revised to be small according to the difference between these pressures.

Thereby, by reducing the W/C pressure by releasing the brake fluid to the master reservoir 3a side, the measured W/C pressure D [MPa] may be able to approach the target W/C pressure.

Further, when a slip ratio represented by a deviation between a wheel speed and a vehicle speed exceeds a threshold value, the ABS control is executed, the boosting control valves 52a-52d and the decompressing control valves 53a-53d of control-targeted wheels are controlled, and the W/C pressure is boosted or decompressed. Thus, a tendency that the wheels lock is avoided.

Further, time lengths for one scale on the horizontal axis representing the time are different in FIG. 5A and FIG. 5B, and the time length for one scale in FIG. 5A corresponds to the multiple time length for one scale in FIG. 5B.

Furthermore, although the operation during the normal braking is explained here, the same operation as described above is performed for an emergency braking that desires to generate a braking force more than the operation of the brake pedal 2.

For example, the emergency braking is defined when an operating speed of the brake pedal 2 exceeds a predetermined threshold or obstacles are present ahead of the vehicle.

In such a case, a braking force larger than the braking force normally generated is generated faster than the operating speed of the brake pedal 2, or in response to the operated amount of the brake pedal 2.

Therefore, although the differential pressure indicating values of the differential pressure control valves 51a, 51b with respect to the operated amount of the brake pedal 2 are configured be larger than a relation shown in FIG. 3 during the emergency braking, the permissible delaying pressure C [MPa] is set to the same manner as the normal braking.

Thereby, even during the emergency braking, operations similar to the normal braking are performed except for configuring the differential pressure indicating values of the differential pressure control valve 51a, 51b corresponding to the target W/C pressure and the differential pressure indicating values of the lower limit indicating valves 83a, 83b obtained by subtracting an amount of the permissible delaying pressure C [MPa] from the differential pressure indicating values of the differential pressure control valve 51a, 51b corresponding mentioned above.

Therefore, it is possible to configure that the difference between the measured W/C pressure D [MPa] and the target W/C pressure does not exceed the permissible delaying pressure C [MPa], thus the measured W/C pressure D [MPa] is made to follow the target W/C pressure during the emergency braking.

In addition, when some kind of trouble occurs, it is assumed that the controls of the various valves by the brake ECU become no longer possible.

In such a case, since the various valve are disposed in positions shown in FIG. 1, the M/C 3 and the W/C 4a-4d are connected through the pipes, thus the M/C pressure generated by the operation of the brake pedal 2 is transmitted to the W/C 4a-4d.

As a result, the generation of the braking force is guaranteed by the hydraulic braking system.

As described above, according to the hydraulic braking system of the present embodiment, the hydraulic pump 55a, 55b provided to the brake actuator 5 can be shared for adjusting the W/C pressure during the ABS control or the like, and for forming the high-pressured accumulator pressure.

Furthermore, although the high-pressured accumulator pressure is formed, the accumulator pressure is not always used during the normal operation when generating the braking force by the hydraulic braking system, the pressurization of the W/C pressure by the hydraulic pumps 55a, 55b is performed.

Then, the accumulator pressure is used when the pressure of the W/C pressure generated by the hydraulic pumps 55a, 55b is delayed with respect to the target W/C pressure.

Therefore, it is possible to reduce the energy loss as compared with a case of using the high-pressured accumulator pressure that is always being pressure-reduced.

As a result, it is possible to constitute the hydraulic braking system 1 that can share the hydraulic pumps 55a, 55b and reduce the energy loss.

Moreover, since the hydraulic pumps 55a, 55b can be shared, it is possible to reduce the number of parts as well as downsizing the system as compared with a case where an extra hydraulic pump is provided for forming the accumulator pressure.

Other Embodiments

It should be appreciated that the present disclosure is not limited to the above embodiment; however, various modifications are possible within the scope of the present disclosure.

In addition, in subsequent embodiments, components identical with or similar to those in the first embodiment are given the same reference numerals, and structures and features thereof will not be described in order to avoid redundant explanation.

For example, a configuration of the brake actuator 5 that can pressurize the W/C 4a-4d by self-priming of the brake fluid by the hydraulic pumps 55a, 55b and can perform the ABS control is given as an example.

However, this merely shows just one example, and the above effect can be obtained by adopting a configuration that stores the accumulator pressure while pressurizing the W/C 4a-4d by self-priming the brake fluid by the hydraulic pump 55a, 55b provided to the brake actuator 5.

Further, although the master reservoir 3a is used as a reservoir that stores the brake fluid, other reservoirs may be used.

Furthermore, the differential pressure between the accumulator pressure and the W/C pressure is to be controlled based on the differential pressure indicating values of the lower limit indicating valves 83a, 83b in the above embodiment.

A form to control the target W/C pressure by varying the differential pressure linearly by varying the differential pressure indicating values of the lower limit indicating valve 83a, 83b as in the above embodiment, and another form that has a high urgency like the emergency braking that does the same as above by on/off controlling the lower limit indicating valves 83a, 83b are considered as methods of controlling the differential pressure.

Although either form may be applied, there are differences as described below.

The differences will be described with reference to FIG. 6.

Figure 6:
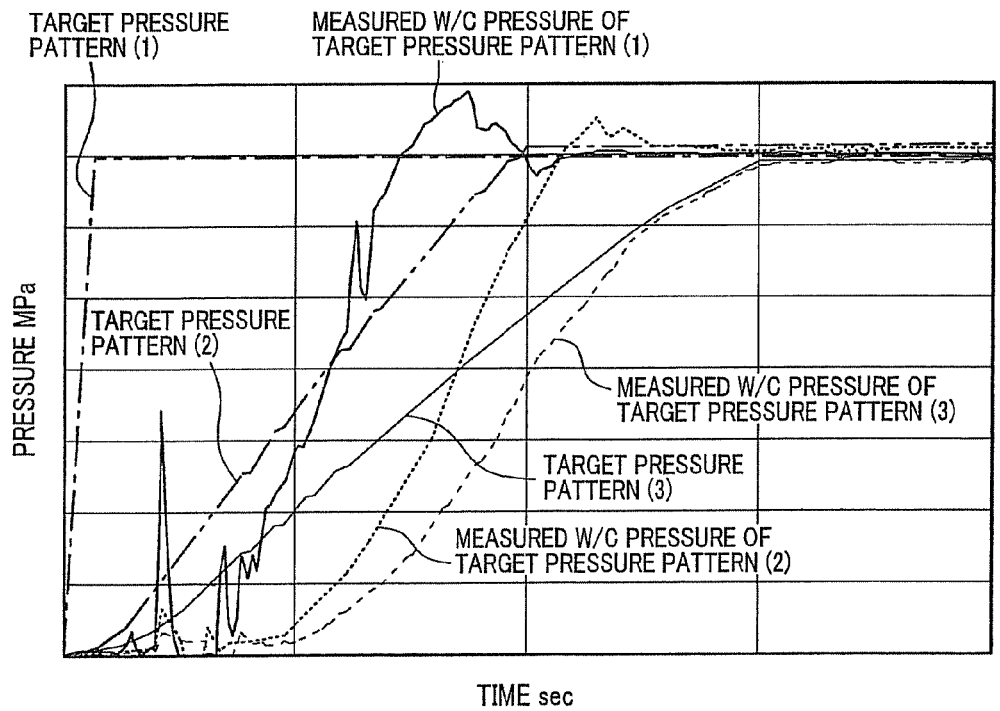
FIG. 6 is a graph showing a relationship between how the differential pressure indicating values of the lower limit indicating valves are changed and how the measured W/C pressure changes when controlling the target W/C pressure.

Regarding FIG. 6, just as in FIG. 5B, time lengths for one scale on the horizontal axis representing the time are different in FIG. 5A and FIG. 6, and the time length for one scale in FIG. 5A corresponds to the multiple time length for one scale in FIG. 6.

As shown in FIG. 6, when the pressurizing of the W/C pressure performed by using the accumulator pressure is tried to instantly bring closer to the target pressure configured based on the permissible delaying pressure C [MPa] (a pattern (1) in FIG. 6), the lower limit indicating valves 83a, 83b are on/off controlled.

In this case, since the W/C 4a-4d are pressurized based on the high accumulator pressure when the lower limit indicating valves 83a, 83b are turned on, it can be applied when the target pressure is desired to be generated faster.

However, the brake fluid is forced to flow to the W/C 4a-4d side based on the accumulator pressure only when the lower limit indicating valves 83a, 83b are turned on, and there is no flow of the brake fluid when they are turned off.

For this reason, although the increased amount of the W/C pressure by the accumulator pressure is allowed to reach the target pressure faster, oil hammers (a shock pressure generated in the hydraulic oil) occur every time the lower limit indicating valves 83a, 83b are turned on, and pulsation occurs in the brake fluid.

Further, a pressure change occurs also during the boosting, and overshoot may also occur with respect to the target pressure.

Therefore, it can be said that controlling an arriving time that a pressuring amount of the W/C pressure required to reach the target pressure is difficult.

In contrast, when the pressuring amount of the W/C pressure is intended to get closer gradually to the target pressure by using the accumulator pressure (patterns (2) and (3) in FIG. 6), the differential pressure indicating values of the lower limit indicating valves 83a, 83b is configured to be higher gradually.

In this way, the oil hammers and the pulsation of the brake fluid are reduced as compared with the case where the lower limit indicating valves 83a, 83b are on/off controlled, and the pressure change during the boosting also decreases.

Further, since opening areas of the lower limit indicating valves 83a, 83b become smaller in accordance with the pressuring amount of the W/C pressure performed by using an accumulator pressure being approached the target pressure, there is less overshoot after the pressuring amount reaching the target pressure.

In addition, the arriving time required for the pressuring amount of the W/C pressure to reach the target pressure becomes almost the same as the time required that the change of the differential pressure indicating values of the lower limit indicating valve 83a, 83b ends, thus the delay can be mostly ignored.

Therefore, it is possible to easily control the arriving time mentioned above.

Thus, the pattern (1) is selected when a sudden braking is required, while the patterns (2) and (3) are to be selected in other cases.

Thereby, when the sudden braking is required, the braking force is generated quickly, while when otherwise, it is possible to suppress the occurrence of the pulsation of the brake fluid and the oil hammers.

In a case when the oil hammers occur, there is a possibility that it becomes a factor that alters the reaction force of the brake pedal 2, thereby causing noise or causing an uncomfortable feeling to the driver, however, by selecting the patterns (2) and (3) during the normal operation, it is possible to solve these problems.

It should be appreciated that in the above embodiments, a first piping, a second piping, and a third piping of the present disclosure are constituted by various pipes provided in the hydraulic (brake fluid) circuit.

For example, pipes connecting between the master reservoir 3a and suction port sides of the hydraulic pumps 55a, 55b via the pressure regulating reservoirs 54a, 54b correspond to the first piping.

Further, pipes connecting between discharge port sides of the hydraulic pumps 55a, 55b and each W/C 4a-4d correspond to the second piping.

In addition, pipes connecting between the M/C 3 and each W/C 4a-4d via the differential pressure control valves 51a, 51b correspond to the third piping.

What is claimed is:

1. A hydraulic braking system comprising:
   a master cylinder that operates based on an operation of a brake operating member;
   a reaction force generating section connected to the master cylinder that provides a reaction force to the brake operating member in accordance with an operated amount thereof by generating a reaction force hydraulic pressure in the master cylinder in response to the operated amount of the brake operating member;
   a reservoir that stores a brake fluid therein;
   a wheel cylinder that generates a braking force based on a brake fluid pressure;
   a brake actuator that includes a hydraulic pump which generates the brake fluid pressure to the wheel cylinder by sucking the brake fluid from the reservoir and supplying the brake fluid to the wheel cylinder, and sucks the brake fluid discharged from the wheel cylinder side for decompressing the brake fluid pressure from the wheel cylinder during anti-lock braking;
   a self-priming control section provided for the hydraulic pump having an open-when-self-priming valve for controlling a communication and cut-off of a first piping that self-sucks the brake fluid from the reservoir to the hydraulic pump;
   an accumulator for storing the brake fluid pressure in a predetermined pressure range, to which the brake fluid is supplied from the reservoir by the hydraulic pump, connected to a second piping that connects between the hydraulic pump and the wheel cylinder; and
   a high-pressure generating section having a lower limit indicating valve for controlling communication and cut-off between the second piping and the accumulator; wherein
   the master cylinder and the wheel cylinder are connected via a third piping;
   the brake actuator is provided with a differential pressure control valve, which is disposed in the third pipe, for controlling a differential pressure between a master cylinder side and a wheel cylinder side; and
   a suction side of the hydraulic pump is connected to the third piping between the master cylinder and the differential pressure control valve and a discharge side of the hydraulic pump is connected to the third piping between the wheel cylinder and the differential pressure control valve.

2. The hydraulic braking system according to claim 1, wherein,
   the reaction force generating section includes a cutoff valve provided in the third piping between the master cylinder and the differential pressure control valve;
   a stroke simulator connected to the master cylinder; and
   a simulator cutoff valve that controls a communication and cutoff between the stroke simulator and the master cylinder.

3. The hydraulic braking system according to claim 2, wherein,
   when generating the brake fluid pressure to the wheel cylinder, the brake fluid is supplied to the wheel cylinder by actuating the hydraulic pump under a condition where the third piping is closed by the cutoff valve, the first piping is opened by the open-when-self-priming valve, and the differential pressure control valve is set to a differential pressure condition.

4. The hydraulic braking system according to claim 2, wherein,
   when the brake fluid pressure stored in the accumulator is lower than the predetermined range, the brake fluid is supplied to the accumulator by actuating the hydraulic pump under a condition where the first piping is made in communicated condition by the open-when-self-priming valve, between the accumulator and the second piping is made in communicated condition by the lower limit indicating valve, and the differential pressure control valve is made in a differential pressure condition.

5. The hydraulic braking system according to claim 3, wherein,
   when the brake fluid pressure stored in the accumulator is lower than the predetermined range, the brake fluid is supplied to the accumulator by actuating the hydraulic pump under a condition where the first piping is made in communicated condition by the open-when-self-priming valve, between the accumulator and the second piping is made in communicated condition by the lower limit indicating valve, and the differential pressure control valve is made in a differential pressure condition.

6. The hydraulic braking system according to claim 2, wherein,
   when generating the brake fluid pressure to the wheel cylinder, the brake fluid is supplied to the wheel cylinder by actuating the hydraulic pump under a condition where the third piping is made in a cutoff condition by the cutoff valve, the first piping is made in communicated condition by the open-when-self-priming valve, and the differential pressure control valve is made in a differential pressure condition; and
   the brake fluid is supplied also from the accumulator to the wheel cylinder under a condition where between the accumulator and the second piping is made in communicated condition by the lower limit indicating valve.

7. The hydraulic braking system according to claim 3, wherein,
   when generating the brake fluid pressure to the wheel cylinder, the brake fluid is supplied to the wheel cylinder by actuating the hydraulic pump under a condition where the third piping is made in a cutoff condition by the cutoff valve, the first piping is made in communicated condition by the open-when-self-priming valve, and the differential pressure control valve is made in a differential pressure condition; and the brake fluid is supplied also from the accumulator to the wheel cylinder under a condition where between the accumulator and the second piping is made in communicated condition by the lower limit indicating valve.

8. The hydraulic braking system according to claim 4, wherein, when generating the brake fluid pressure to the wheel cylinder, the brake fluid is supplied to the wheel cylinder by actuating the hydraulic pump under a condition where the third piping is made in a cutoff condition by the cutoff valve, the first piping is made in communicated condition by the open-when-self-priming valve, and the differential pressure control valve is made in a differential pressure condition; and the brake fluid is supplied also from the accumulator to the wheel cylinder under a condition where between the accumulator and the second piping is made in communicated condition by the lower limit indicating valve.

9. The hydraulic braking system according to claim 5, wherein, when generating the brake fluid pressure to the wheel cylinder, the brake fluid is supplied to the wheel cylinder by actuating the hydraulic pump under a condition where the third piping is made in a cutoff condition by the cutoff valve, the first piping is made in communicated condition by the open-when-self-priming valve, and the differential pressure control valve is made in a differential pressure condition; and the brake fluid is supplied also from the accumulator to the wheel cylinder under a condition where between the accumulator and the second piping is made in communicated condition by the lower limit indicating valve.

10. The hydraulic braking system according to claim 9, wherein, the lower limit indicating valve is a differential pressure control valve for generating the differential pressure in the brake fluid pressure of the accumulator and the brake fluid pressure of the wheel cylinder according to an amount of current supplied to a solenoid; and when supplying the brake fluid to the wheel cylinder from the accumulator, the differential pressure is increased gradually by increasing the amount of current supplied to the solenoid of the lower limit indicating valve gradually.

\* \* \* \* \*